Figure 1:
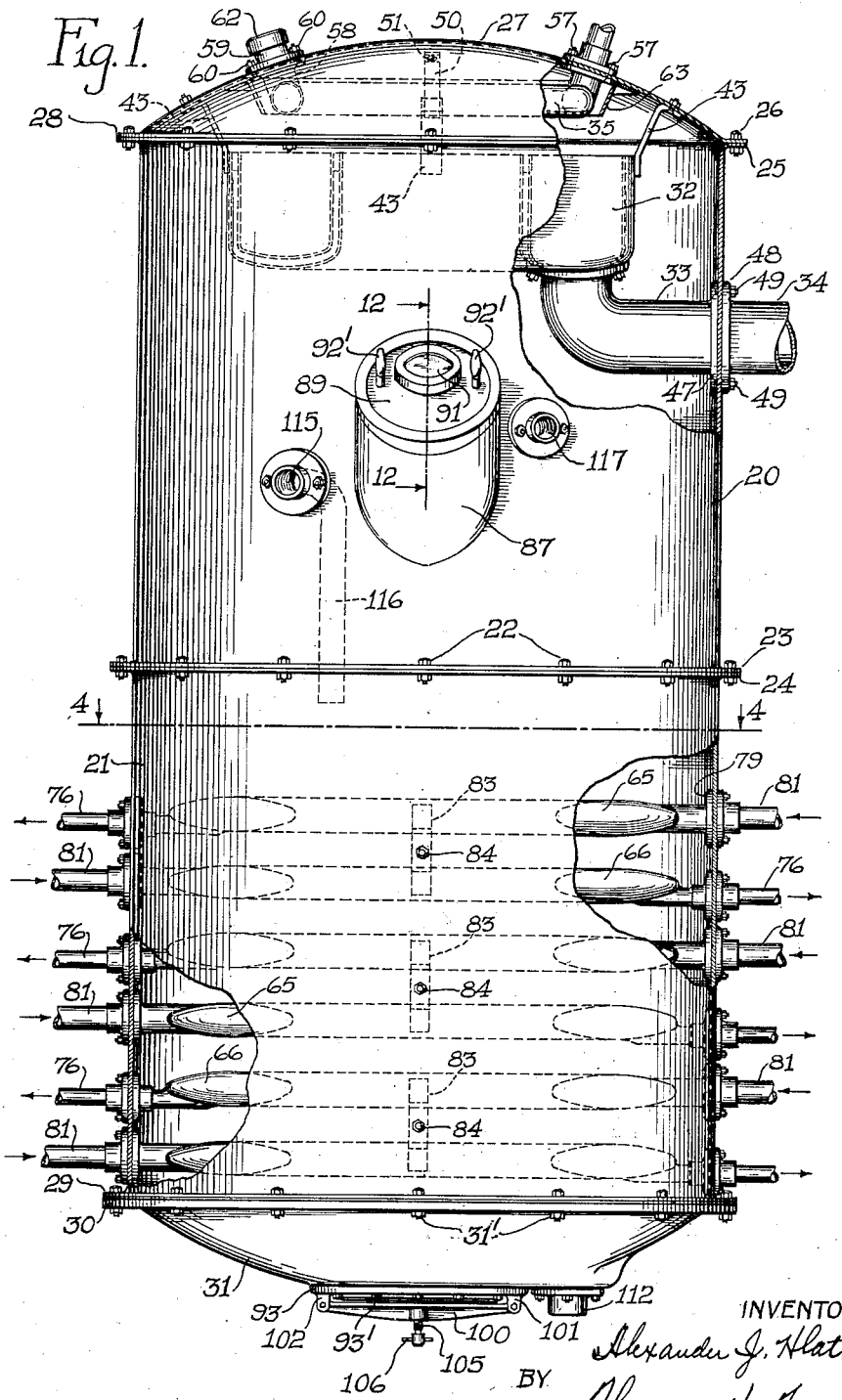

Jan. 19, 1932.   A. J. HLATKY   1,841,812
VACUUM PAN AND THE LIKE
Filed March 24, 1930   5 Sheets-Sheet 2

INVENTOR.
Alexander J. Hlatky
BY Thomas H. Ferguson
ATTORNEY.

Jan. 19, 1932.    A. J. HLATKY    1,841,812
VACUUM PAN AND THE LIKE
Filed March 24, 1930    5 Sheets-Sheet 3
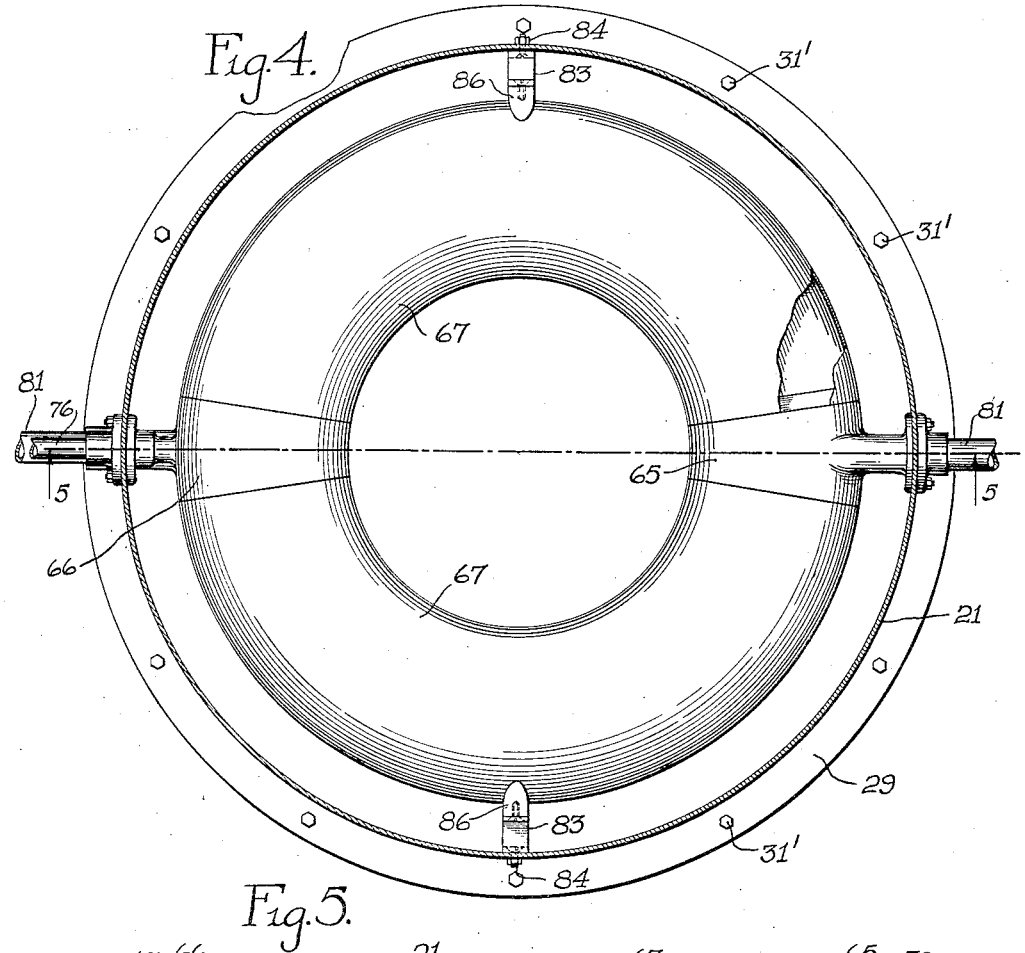
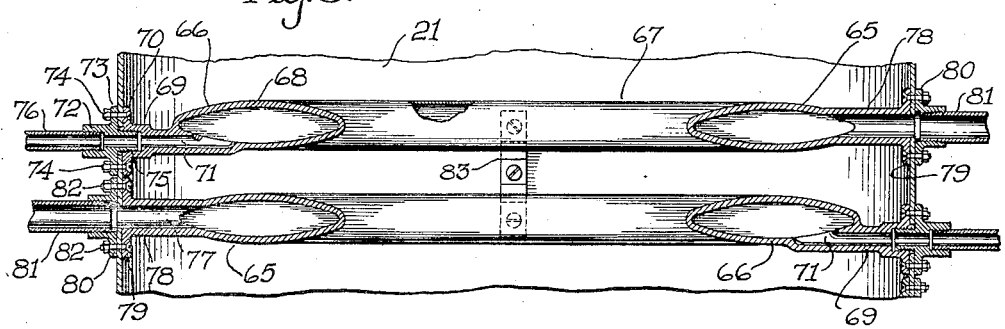
INVENTOR.
Alexander J. Hlatky
BY Thomas H. Ferguson
ATTORNEY.

Jan. 19, 1932.  A. J. HLATKY  1,841,812
VACUUM PAN AND THE LIKE
Filed March 24, 1930    5 Sheets-Sheet 4
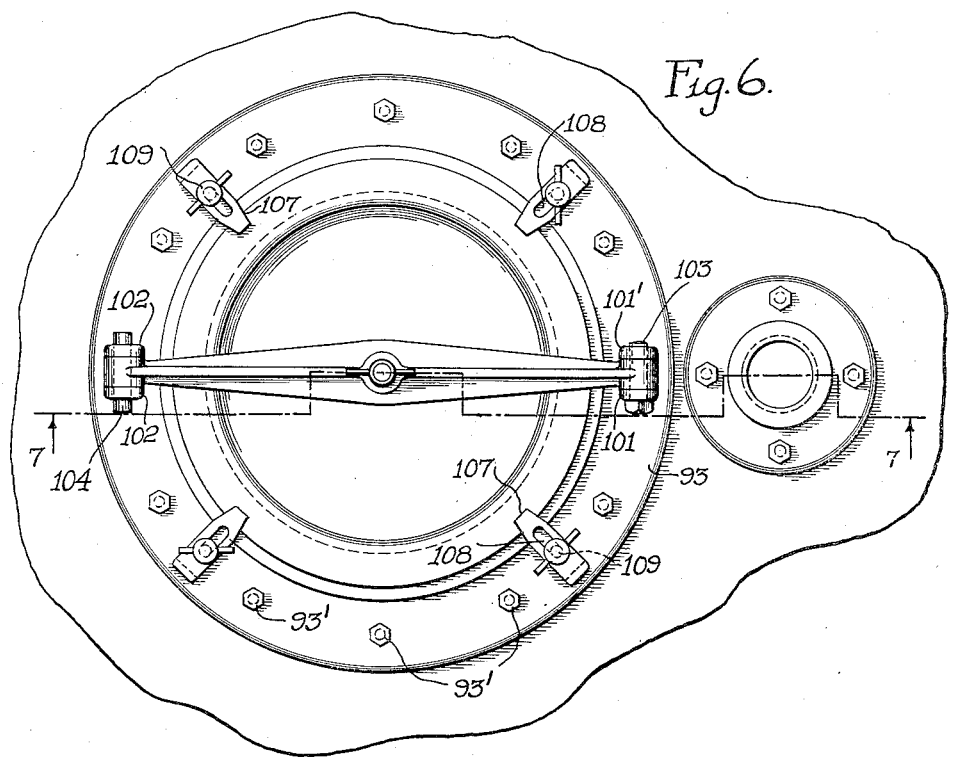
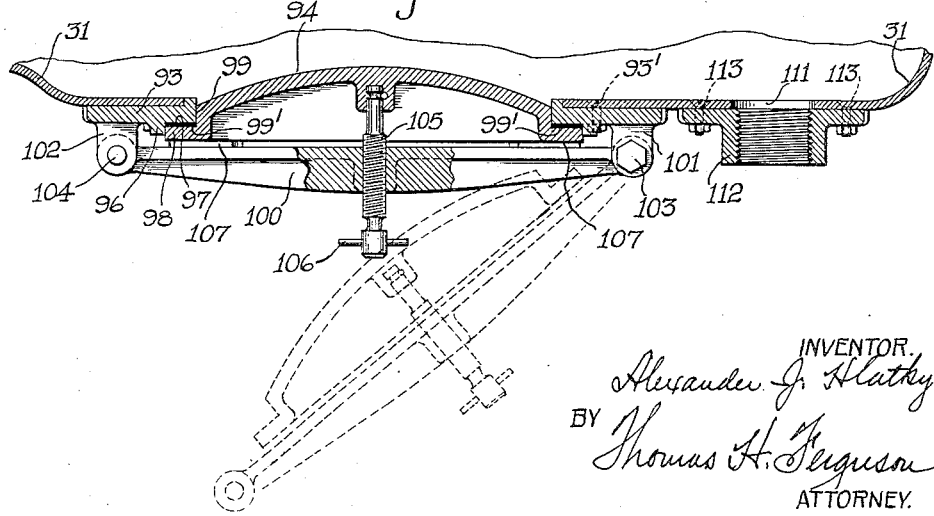
INVENTOR.
Alexander J. Hlatky
BY Thomas H. Ferguson
ATTORNEY.

Jan. 19, 1932.  A. J. HLATKY  1,841,812
VACUUM PAN AND THE LIKE
Filed March 24, 1930  5 Sheets-Sheet 5
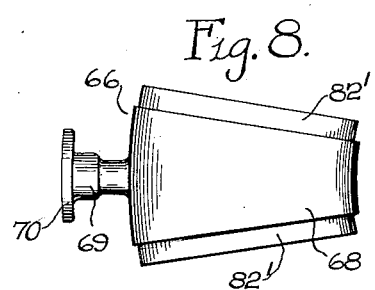
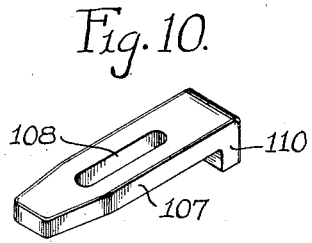
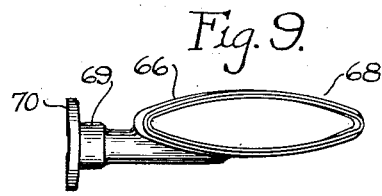
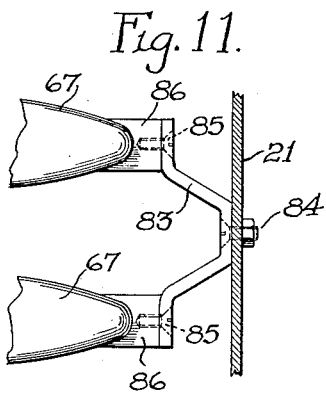
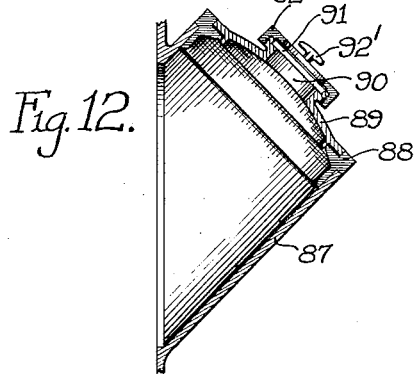
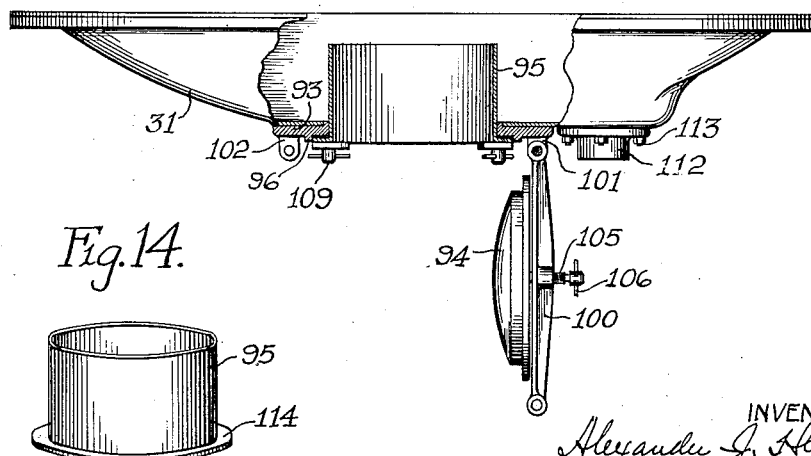
INVENTOR,
Alexander J. Hlatky
BY Thomas H. Ferguson
ATTORNEY.

Patented Jan. 19, 1932

1,841,812

UNITED STATES PATENT OFFICE

ALEXANDER J. HLATKY, OF CHICAGO, ILLINOIS

VACUUM PAN AND THE LIKE

Application filed March 24, 1930. Serial No. 438,374.

The present invention relates to vacuum pans and like containers and has to do with, among other things, improvements in the steam or other coil units by which the liquid in the pan is treated and the manhole arrangements by which access may be had to the interior of the pan for thorough cleaning. I also show water spraying and vapor guiding devices at the top of the pan by which the moisture freed from the heated liquid will be carried from the pan, but do not claim this part of the invention herein.

Although my invention, as a whole and in respect to its several individual features, is or may be capable of application to different liquids in different treating methods, yet the invention has been devised and perfected with reference to the treating of milk and will be illustrated and described in that connection.

One object of the invention is to provide novel liquid treating units which are separate and distinct from each other and of such form and relative arrangement that the treatment of the liquid, whether the evaporation of milk or otherwise, may be greatly increased without increasing the dimensions of the enclosing casing, or, conversely stated, such that the same output will be maintained with a much smaller casing or holder.

Another object is to construct the new coil units with smooth and readily cleanable surfaces throughout and to so position the coils that a workman within the casing can readily reach all parts of these units and also the adjacent portions of the wall of the casing to thoroughly clean them.

Another object is to provide a manhole opening in the bottom of the casing so that a workman may enter from beneath into a space embraced by the treating units, and there work upon these units and the walls to clean or otherwise treat them. In this connection I have had another object in view, namely, to devise some means for keeping the workman dry while entering the casing through the bottom manhole. To this end, I employ a removable dam which may be readily inserted in and withdrawn from the manhole opening.

In connection with these objects I also have in view to produce a vacuum pan embodiment which will be highly efficient in operation and require but low steam and water consumption.

In further description of the invention I will limit myself to a disclosure of a vacuum pan embodiment of the same.

In carrying out such embodiment, I preferably arrange the condensing apparatus in the upper part of the shell and the steam heating units in the lower part of the shell. These units are preferably provided in each case with a tubular interior space or opening which is elliptical in cross section with the major axis of the ellipse horizontal. In plan, the coil units are circular and they are arranged one above another in a vertical series, the various units lying in substantially parallel horizontal planes. In this way I provide a central space into which a workman may enter through a manhole in the bottom of the casing. By using the flat coils with elliptical tubular cross sections I am able to obtain a very large heating surface and still have a central space of large diameter, when compared with the prior practice of having coils having tubular openings of circular cross section. The result of my arrangement is a greatly improved action while the pan is in operation and greatly improved facilities for cleaning when the pan is idle.

The various objects and features of my invention, including those above mentioned and others, will be more fully understood upon reference to the following detailed description taken in connection with the accompanying drawings, while the scope of the invention will be particularly pointed out in the appended claims.

Figure 2:
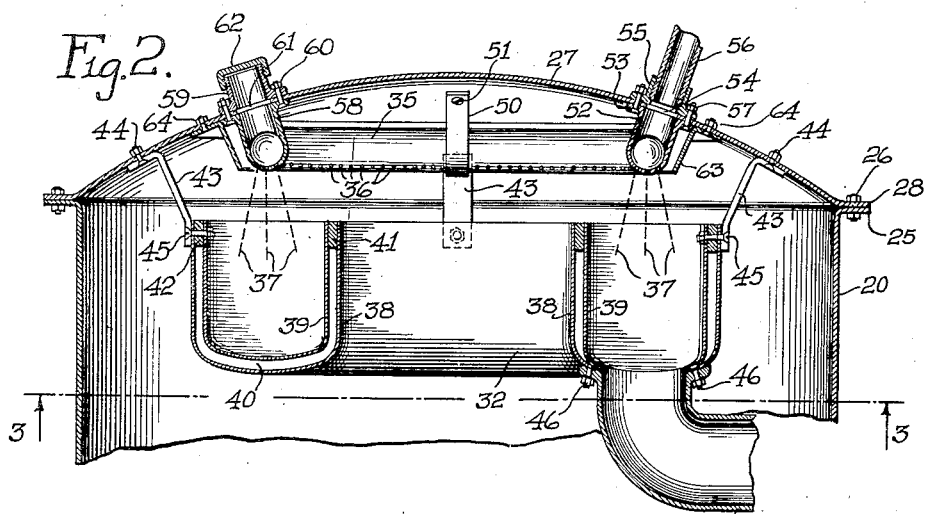
Figure 3:
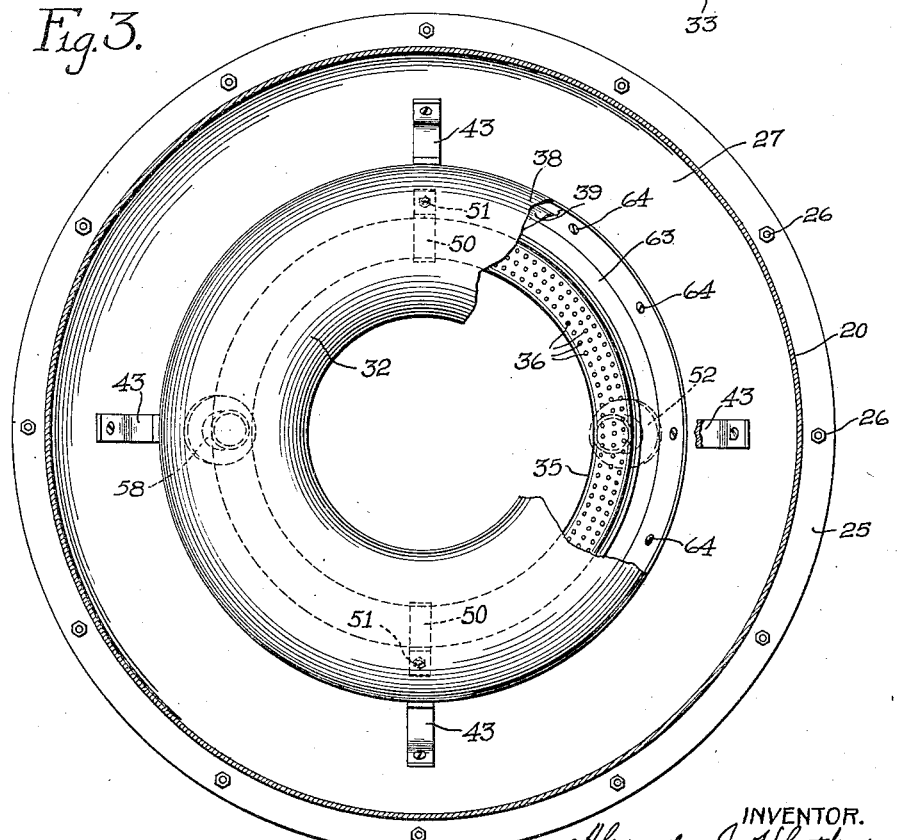

In said drawings, Fig. 1 is a side elevation of a vacuum pan constructed in accordance with the present invention, portions of the shell or casing of the pan being broken away to show parts within; Fig. 2 is a central vertical section of the upper portion of the pan, illustrating particularly the condensing apparatus; Fig. 3 is a bottom plan view of the structure of Fig. 2, the shell being shown in section taken on a plane indicated by the line 3—3 of Fig. 2, and portions of the trough of the condensing mechanism being broken away to show more clearly the outlets in the water supply pipe; Fig. 4 is a horizontal section of the pan taken on a plane indicated by the line 4—4 of Fig. 1, wherein one of the heating units is clearly shown in plan; Fig. 5 is a vertical section through two heating units and adjacent parts of the casing, the plane of section being indicated by the line 5—5 of Fig. 4; Fig. 6 is an underneath plan view of a portion of the bottom of the pan showing the lower manhole and its cover adjacent to the outlet of the pan; Fig. 7 is a vertical section of the parts shown in Fig. 6, the plane of section being indicated by the line 7—7 of Fig. 6; Fig. 8 is a plan view of the outlet member of one of the steam coil units; Fig. 9 is a side elevation of the same outlet member; Fig. 10 is a perspective view of one of the removable bars or cleats by which the parts fitted into the lower manhole are held firmly seated whether the part fitted in be the manhole cover or the dam by which the workman is kept dry when entering the manhole; Fig. 11 is a detail view illustrating one of the brackets by which two steam coil units are secured to the casing, in addition to the support furnished by the inlet and outlet members; Fig. 12 is a vertical section through the upper manhole and its cover, the plane of section being indicated by the line 12—12 of Fig. 1; Fig. 13 is a side view of the bottom of the pan with the cover open and the dam inserted in the manhole opening, portions being broken away and other portions being shown in section for clearness; and Fig. 14 is a perspective view of the dam which is employed in the lower manhole when cleaning out the pan. Throughout these views like characters refer to like parts.

Referring to said drawings in detail, 20 and 21 designate, respectively, the upper and lower portions of the casing or shell of the vacuum pan. These two portions are made of sheet metal, preferably copper, and are connected together by bolts and nuts 22 passing through openings in mating flanges 23 and 24. The upper end of the member 20 is provided with a similar flange 25. To this flange bolts and nuts 26 secure the pan top 27. The latter is provided with a flange 28 at its periphery which mates with the flange 25 upon the shell member 20. Similarly, the lower end of the casing member 21 is provided with a flange 29 which mates with a peripheral flange 30 upon the pan bottom 31 and in this case bolts and nuts $31^1$ cooperate with openings through the flanges to secure the members 21 and 31 together. The top 27 and the bottom 31 are also formed of sheet metal and, as before, this metal is preferably copper.

The condensing mechanism is located in the upper part of the pan. This mechanism includes a trough 32 which has an outlet pipe 33 which communicates through a pipe 34 with the usual condensing pump employed in vacuum plan installations. The trough 32 has an open top and it lies directly beneath the spray pipe 35. The latter has a large number of small openings 36 in its under side and from these, small jets of water strike upon the vapors which rise in the pan and condense them within the trough 32. The water thus delivered to the trough is carried off through the pipe connections 33 and 34 as rapidly as received. As shown, the spray pipe 35 and the trough 32 are circular and concentric with respect to the vertical axis of the pan. The dash lines 37 in Fig. 2 indicate in a general way the direction in which the water is projected from the pipe 35 toward and into the trough 32.

The trough 32 is made up of two walls 38 and 39. These walls are spaced apart to provide an insulating air space 40. This is for the purpose of preventing condensation on the under side of the trough and requiring the vapors to rise to the upper side of the trough before the water is condensed from them. Upon the upper side they will encounter the condensing waters from the openings 36 and will be promptly condensed. The walls 38 and 39, which are preferably composed of copper, are separated at their top inner edges by a band or ring 41 which lies as a horizontal circle concentric with the vertical axis of the pan. The outer edges of the walls 38 and 39 are connected and spaced by a similar ring 42 which is concentric with the inner ring 41. The trough 32 is supported as a whole by a plurality of brackets 43, in the embodiment illustrated four such brackets being used. These brackets are secured at their upper ends to the pan top 27 by any suitable means, such as bolts and nuts 44. The lower ends of the brackets 43 are secured to the outer edge of the trough 32, preferably by screw bolts 45 which extend through the walls 38 and 39 and the intervening ring 42, and are provided with suitable nuts. Obviously, other arrangements might be made for supporting the trough 32, but it is desirable in any event to make the supporting means small so that they will not interfere with the flow of vapor through the upper portion of the pan to the condensing zone above the trough 32.

Where the pipe elbow 33 is connected to the trough 32 the walls 38 and 39 may be brought together so as to form a suitable body through which attaching means, such as the bolts and nuts 46, may be passed. Of course, other arrangements might be employed, if desired. The elbow 33 is flanged at the point where it engages the shell member 20, and its flange 47 cooperates with a mating flange 48 on the pipe 34 to complete the connection from the trough to the pump. Of course, the shell member 20 is perforated at the points where the pipes 33 and 34 register, and the flanges 47 and 48 are used in forming a tight joint at this point. Preferably, bolts and nuts 49 serve as connecting means, each bolt passing through both flanges as well as through an opening in the intervening shell member 20.

The spray pipe 35 may also be variously mounted. In the embodiment shown a plurality of hangers 50 are employed for this purpose. Each hanger is curved at its lower end to embrace the under side of the pipe 35 and it is bent at an angle at its upper end to provide a lug by which it may be secured to the pan top 27. Preferably, connections are made between the hangers 50 and the pan top by means of bolts and nuts 51. The connection of the spray pipe 35 to the pan top 27 is also increased by the supply connection through which water is admitted to said pipe. This connection includes a tubular part 52 upon the pipe 35 which is provided with a flange 53 which engages the inner face of the shell top 27 around the opening 54 in said top. In like manner the flange 55 upon the supply pipe 56 surrounds the same opening and the flanges 53 and 55 are mated and, in a manner similar to the flanges 47 and 48, these flanges are connected by bolts and nuts 57. The spray pipe 35 is further supported by a similar pipe connection which includes the flanged portion 58 and the flanged pipe connection 59, likewise secured to the shell member 27 by bolts 60 about an opening 61 in the shell. In this case the short pipe section 59 is provided with a cap 62. The purpose of the opening 61 with these associated parts is to provide access to the interior of the spray pipe 35 to enable it to be readily cleaned out as occasion may require. By removing the cap 62 a brush may be inserted through opening 61 and into the interior of the pipe 35 for thus cleaning it.

With the construction shown, it will be apparent that the vapors rising from the lower portion of the pan will pass upward both through and around the trough 32 and strike against the pan top 27 and thence be brought into contact wtih the jets of water coming from the spray pipe 35. Then condensation will take place and the water will pass off through the trough and pipe connections, as before explained. To assist in properly directing these vapors in their travels from the lower part of the pan to the zone where they will be subject to the sprays of the cooling water, I employ a baffle plate 63 which is circular in outline and lies just outward of the spray pipe 35. The upper end of this baffle is outwardly flanged for connection to the pan top 27. Any suitable connecting means may be employed for this purpose, such as the screw bolts and associated nuts 64. The baffle plate 63 serves to guide the vapors which pass upward around the outside of the trough 32 down into the condensing water jets. The same plate also serves to bring about a downward movement of those vapors which pass up through the center of the trough 32. As such vapors spread out, they encounter the baffle and move downward under the pressure of other vapors behind them and are thus brought into contact with the water jets, as before. The arrangement of parts in the top of the vacuum pan also prevents the formation of eddies in which the vapors may remain without circulating to those parts of the pan where they will come into contact with the condensing water.

The heating units at the bottom of the vacuum pan are, in the present instance, individual and separable units comprising in each instance an inlet member 65, an outlet member 66, and two tubular connecting members 67. The members 65 and 66 are preferably in the form of castings, while the tubular members 67 which connect them are composed of sheet metal, preferably copper, and the ends of the members 67 are brazed to the castings. In each instance the members 65 and 66 comprise a tubular portion which has the same tubular bore as the sheet metal members 67. And at this point it may be noted that the bore or the interior space within the heating units is at every point elliptical in radial cross section, the major axis of the ellipse lying horizontal. Of course an oval shape, or another closely approximating the elliptical, would answer the same purpose. In Figs. 8 and 9 an outlet member of the heating unit is clearly shown. There the large tubular portion is designated 68 and this portion is concentric with the vertical axis of the pan when the unit is in assembled position. Besides having this large tubular portion, the outlet member 66 has a small tubular portion 69 which extends radially outward from the portion 68 and is provided at its outer end with a flange 70 which is curved horizontally to fit accurately against the inner wall of the shell member 21. As clearly shown in Figs. 5 and 9, the portion 69 drops down a little from the horizontal axis of the ellipse and the opening 71 is thus in position to drain water from the unit whenever such water is formed. In the case of this outlet connection, a gland 72 lies on the outside of the shell 21 and has a flange 73 which cooperates with the flange 70. Suitable bolts and nuts 74, passing through openings in the flanges 70 and 73 and the intervening shell 21, connect the parts together. To provide a tight joint, the member 72 has a projecting sleeve 75 which enters a cooperating opening in member 69. When the parts are secured together by tightening the bolts and nuts 74, packing in the interior of the member 69 is compressed to make a close and waterproof joint. The outer end of the member 72 is threaded for the reception of a discharge pipe 76.

The inlet member 65 is similar to the outlet member 66, but its radial opening 77 is not dropped down from the axis of the elliptical opening but is made linear with it, as clearly illustrated in Fig. 5. In this case the radial portion 78 is flanged and its flange 79 cooperates with a flange 80 on the adjacent end of the supply pipe 81 to form a tight joint for the steam which is supplied through the pipe 81. Of course there is an opening through the shell 21, and the opening of the pipe 81 and the opening 77 of the member 65 register with it. Bolts and nuts 82 serve to hold the parts together, as before.

As clearly shown in Figs. 8 and 9, the tubular portion 68 of the member is provided at its ends with reduced portions or flanges 82'. The ends of the sheet metal members 69 fit upon these reduced portions and abut against the square shoulders formed contiguous thereto, and when in this position the members 67 are brazed to the members 65 and 66. Such a construction will be found to be durable and efficient, the thinner sheet metal portions 67 readily giving off the heat of the contained steam to the liquid about the heating units.

It will be seen that the members 65 and 66, being securely attached to the casing 21 at two points, will serve to support the units quite well. However, as a matter of precaution, I also employ at points midway between these members 65 and 66 brackets 83 which preferably have the particular form illustrated in Fig. 11. As there shown, the center of the bracket fits against the inside of the casing member 21 and is secured to it by any suitable means, such as the bolt and nut 84. The opposite ends of the bracket 83 are attached by screws 85 to projections or lugs 86 secured to adjacent portions of the sheet metal parts 67 of the heating units. Obviously these lugs 86 may be attached to the parts 67 in any suitable way; preferably, however, this is done by brazing the parts together.

I have not shown the connections by which steam is supplied to the heating units, but it will be obvious that the various pipes 81 which are the inlet pipes, will be connected to a source of supply, and the outlet pipes 76 may be connected, as desired, to any outlet.

An inspection of the drawings will show that the opening through the center of one of the heating units has a diameter about equal to twice the major axis of the elliptical opening of the unit. A like inspection will also show that the space between the units is about equal to the vertical dimension of the units. Similarly, it will be seen that there is considerable space between the shell 21 and the nearest surface of the unit in each case. The space in the center of the units is such that a workman can easily stand in the space and be free to move about in it sufficiently to reach in between the various heating units for the purpose of cleaning off the interior surface of the wall 21, as well as the outer surfaces of the units and their connections to that wall.

In this connection it may be noticed also that the condenser trough 32 has a central opening or space around which it extends and that it is likewise spaced inward from the walls of the pan so that a man within the pan may reach up either while standing on the bottom of the pan or on a ladder within it and wash both the outside and the inside of the condenser trough and other adjacent parts.

In order to get access to the interior of the pan, it has been customary to employ an upper manhole provided by a tubular extension 87 formed in the casing member 20, as clearly shown in Figs. 1 and 12. This extension is ordinarily fitted with a flanged ring 88 upon which a cover 89 fits. The latter has a central opening 90 which is closed by a glass disk 91 in the form of a lens or plain glass, and this glass is held in place by a clamping ring 92 which is screwed on to the threaded flange upon the cover 89. This structure provides a peek hole through which the operator may look to determine the contents of the pan at any time. The cover, which is provided with two handles 92', is held in place normally by the vacuum within the pan. When it is desired to enter the pan, then the cover 89 and the ring 88 are removed. Then the workman passes down through the tube 87 into the interior of the pan. Although this way may be relied upon for the purpose of getting to the coils at the bottom of the pan, still I prefer to provide an additional opening through which access to the coils may be had.

The additional opening is a manhole in the bottom plate 31 of the pan. This manhole structure may, of course, be considerably varied. Preferably, it includes a ring 93 which is secured to the bottom 31 in any suitable way as by screw bolts and nuts 93', and the ring serves as a support and seat for the removable door 94 and the removable dam 95. In the preferred construction the ring 93 has a downwardly extending annular rib 96, and inward of this rib a smooth annular seat 97. The door 94 has a peripheral flange 98 which fits against the seat 97 and just clears the inner face of rib 96. The door also has a shoulder 99 which just clears the inner wall of the ring 93. With this arrangement, the cover 94 can be brought into close and leakproof connection with the bottom of the pan. If desired, a suitable gasket 99' may be employed upon the seat 97 so as to be compressed by the flange 98 when the cover is firmly seated.

In order to firmly seat the cover 94, I preferably employ a cross bar 100 which cooperates at its ends with lugs 101 and 102 extending downward from the ring 93. The ends of the bar 100 and the lugs 101 and 102 are apertured to allow the entrance of retaining pins 103 and 104. Preferably, the pin 103 is headed and threaded into one of the lugs 100 so as to serve as a pivot, while the other pin 104 is a smooth pin which, under certain conditions may be driven out of engagement with the lugs 102 and the end of the bar 100. This pin is removed as one step in the operation of loosening up the parts with a view to removing the cover. This latter, however, cannot be done until the central clamping screw 105 is loosened. This screw has a swivel bearing in the cover 94 and is threaded to engage the threaded opening in the bar 100. At its outer end it is provided with a cross pin 106 to enable it to be readily turned. In practice, while the cover 94 occupies a position close to the bar 100, the latter is moved about its pivot from its open position, shown in Fig. 13, to the dotted line position of Fig. 7, and thence up to the point where the pin 104 may be inserted to hold that end of the bar. When this is done, the cover 94 will not be in close contact with the seat 97. Such close contact, however, will be brought about by turning upon the screw 105 to force the cover 94 against the seat.

As an additional means for holding the cover 94 in closed position, I employ a series of clamping bars or cleats 107. Each of these has a central slot 108. Through these slots headed bolts or screws 109 may be passed into threaded engagement with threaded openings in the ring 93. By having the diameters of the heads larger than the width of the slots 108, the cleat 107 will be firmly secured to the ring 93 and the forward end of the cleat will press against the flange 98 of the cover 94. The small flange 110 at the outer end of the cleat 107, in each instance, serves to hold that end of the bar a proper distance away from the ring 93. This enables the opposite end of the cleat 107 to form a better contact with the flange 98 and thus hold the cover more firmly.

Adjacent to the lower manhole the bottom 31 of the pan has an opening 111, and associated with this opening is a pipe connection 112 which is suitably positioned and secured to the bottom 31 by screws and nuts 113. This is the outlet opening of the pan and will be connected to an outlet pipe which may run to any one of several places depending upon the particular installation. When not serving to drain the pan, this connection is of course closed. Ordinarily, this is done by a valve in the outlet pipe.

It will be seen that the manhole opening in the bottom 31 is in substantial alignment with the central space embraced by the heating units and that a workman entering the pan by this opening would be able at once to work upon the heating units, the wall, and other parts which would need to be cleaned. Obviously, if this lower manhole is used, the upper one might be omitted and, as before mentioned, if the upper one is used in some instances, it might be satisfactory to omit the lower one.

Where the lower manhole is provided, I also make provision for protecting the workman against the flow of water when he is flushing the interior while cleaning the casing walls and heating units. This is done by using the dam 95. It will be seen that this dam consists of a tube which just fits within the ring 93 of the manhole structure. In addition to this tubular portion, the dam 95 includes a flange 114 which bears against the seat 97 of the ring 93, the same as the flange 98 of the cover 94. When the dam is used, the gasket 99' may also be used upon the seat 97 to be compressed between that seat and the flange 114, when the flange 114 is pressed home by the cleats 107. The latter operate upon the flange 114 of the dam 95 in the same way that they do upon the flange 98 of the cover 94. Consequently, it will not be necessary to describe the steps in detail by which these cleats are used to hold the flange 114 upon its seat 97.

It will be apparent that with the dam 95 in place, a workman will not be injured by water or other liquid in the pan so long as it does not rise high enough to overflow the dam 95. The height of the latter may be varied to suit the circumstances of different cases. Ordinarily, the water or other liquid in the pan will flow quickly through the outlet opening 111 and in such event will not back up so as to overflow the dam.

The vacuum pan connections are the usual ones. There is provided a milk inlet 115. On the inside of the pan this inlet extends downward in the form of a pipe 116. The inlet 115 is a connecting member similar to the outlet member 112. Ordinarily, pipe connections are made with this inlet from a suitable source of liquid supply. In the case which we have chosen to illustrate, this supply is a milk supply. In addition to the milk inlet 115, the usual vacuum break is connected to the vacuum break inlet 117. This inlet is similar in construction to the inlet 115. Ordinarily, a short piece of pipe is secured to the inlet member 117 and the valve is located in this pipe to open and close the interior of the pan to atmosphere. In other words, when the valve is open, the interior of the pan is open to atmosphere and the vacuum is broken. However, whenever the valve is closed and the condensing pump is operating, a vacuum is soon built up again.

In operation, the attendant opens the pipe connected with inlet 115 and milk flows into the pan. Of course, before admitting the milk he closes the bottom manhole by cover 94 and at the same time closes the outlet opening 111. The bottom being thus closed, the milk accumulates in the pan until it covers one of the heating units. Steam is then admitted to that unit. The effect is to immediately cause the milk to boil. As the milk continues to enter it will not be long until the second heating unit is covered. Then steam is admitted to the second unit. This course is continued until all the units are covered and steam has been admitted to all the units. The result of such an operation is to cause the milk to boil vigorously under the vacuum, which is a vacuum of from 22 to 24 inches. The water vapors rising from the milk pass upward around the trough 32 and upward through the center of the trough. There they encounter the condensing water and are themselves condensed and pass out through the trough and its connections.

The flat coil which I employ has a tendency to keep the boiling milk from rising in the vacuum pan. This is a point of real advantage and one which contributes largely to the efficiency of the pan. The flat heating unit also provides a large superficial area. This is likewise of real advantage when the question of efficiency is considered. Besides these benefits, there will be others which will at once be apparent to persons skilled in this art.

As before indicated, the different features of the invention may be independently operated in different connections. This is particularly true of the liquid treating units which may be used generally to advantage for both heating and cooling purposes.

Although I have specified copper as the metal best adapted for the shell and other parts of my vacuum pan, it will be understood that in certain cases other metals may be used, such as Allegheny metal or the like, in fact any metal that may be brazed or welded and would be suitable for the uses to which the pan is to be put.

In carrying out my invention there may be many alterations and modifications of the structure which I have shown, and these may be made without departing from the spirit and scope of my invention. I therefore do not wish to be limited to the details herein disclosed, but aim to cover by the terms of the appended claims all those changes which rightly come within the scope and purview of my invention.

What I claim as new and desire to secure by a patent of the United States is:

1. A vacuum pan comprising a cylindrical enclosing casing having its axis vertical and a vertical series of circular steam coil units positioned therein in parallel horizontal planes, each unit comprising a tubular coil, the tubular opening of which is of elliptical cross section throughout with the major axis of the ellipse subsantially horizontal, the area of said cross section being substantially the same at all points throughout the length of the coil, and inlet and outlet connections for each of said coils, the outlet opening through each outlet connection being at a slightly lower level than the supply opening through the associated inlet connection, said connections registering and cooperating with openings through the wall of said casing on its opposite sides.

2. A vacuum pan comprising a cylindrical enclosing casing having its axis vertical and a vertical series of circular steam coil units positioned in the lower part of said casing in parallel horizontal planes, each unit comprising a tubular coil, the tubular opening of which is elliptical in cross section and of practically the same area throughout the length of the coil, the major axis of the ellipse being substantially horizontal, inlet and outlet tubular connections for each of said coils secured to opposite sides of said casing and registering and cooperating with openings in said casing, said connections spacing said units inward from the cylindrical wall of said casing a substantial distance to allow a peripheral space for cleaning purposes, the central cylindrical space extending up through the series of coil units being sufficient to allow a man to enter to clean the coils and the interior of the casing, the bottom of said casing directly beneath said cylindrical space being provided with a manhole, and a removable cover for said manhole.

3. A vacuum pan comprising a cylindrical enclosing casing having its axis vertical and a vertically aligned series of circular steam coils each with a tubular opening of elliptical cross section throughout with the major axis of the ellipse substantially horizontal, inlet and outlet members forming parts of each of said coil units and being connected to the wall of said casing at opposite sides and having their inlet and outlet openings in registry and cooperative relation with inlet and outlet openings in the wall of said casing at said points of connection, said coil units being spaced from said wall and from each other a distance approximating the vertical thickness of any one of said coil units and providing a central space equal in diameter to about twice the horizontal thickness of any one of said coil units, said central space being large enough to admit a person to clean the units, wall and other parts within the casing, and the spacing of the coil units from the wall and from each other being such as to permit the person in said central space to get at all surfaces to clean the same, the casing bottom being provided with a manhole directly beneath said central space, and a removable cover for said manhole.

4. A vacuum pan comprising a cylindrical enclosing casing having its axis vertical and a vertical series of steam coils concentric with said axis providing a central space for the admission of a person to clean the interior walls of the casing, the coils and other parts, the bottom of said casing directly beneath said central space being provided with a manhole, a removable circular dam having a flange adapted to engage a seat about said manhole and a vertical sleeve adapted to extend upward through said manhole, and means for providing a substantially water tight joint between said dam and seat.

5. A vacuum pan comprising a cylindrical enclosing casing having its axis vertical and a vertical series of steam coils concentric with said axis providing a central space for the admission of a person to clean the interior walls of the casing, the coils and other parts, the bottom of said casing directly beneath said central space being provided with a manhole, a removable circular dam having a flange adapted to engage a seat about said manhole and a vertical sleeve adapted to extend upward through said manhole, and means for producing a substantially water tight joint between said dam and seat, said casing bottom having a drain opening outward of said circular dam.

6. In a vacuum pan, a steam coil unit consisting of oppositely disposed inlet and outlet members and intervening sheet metal tubes joining said members, each said member being a casting having a main tubular portion and a radial tubular portion extending outward from said main portion, the radial portions of said members being adapted for connection to suitable inlet and outlet pipes, one inlet and one outlet connection for each unit, said main tubular portions terminating at each end in prolonging flanges projecting outward beyond transversely extending abutting shoulders, the sheet metal tubes being composed of thin material abutted against said shoulders and fitted snugly over, and secured to, said flanges, the tubular portions of said castings and the sheet metal tubes connected thereto being concentric with the axis of the unit, and the cross sectional opening through the coil being elliptical throughout with the major axis of the ellipse in the plane of the coil.

7. In a vacuum pan, a steam coil unit consisting of oppositely disposed inlet and outlet members and intervening sheet metal tubes joining said members, each said member being a casting having a main tubular portion and a radial tubular portion extending outward from said main portion, said radial portions being adapted for connection to suitable inlet and outlet pipes, one inlet and one outlet connection for each unit, said main tubular portions terminating at each end in prolonging flanges, the sheet metal tubes being composed of thin material fitted snugly over, and secured to, said flanges, the tubular portions of said castings and the sheet metal tubes connected thereto being concentric with the axis of said unit, and the cross sectional opening through the coil being elliptical throughout with the major axis of the ellipse in the plane of the coil.

8. A vacuum pan comprising a cylindrical enclosing casing, steam coil units therein in upright series providing a central space for the admission of a person to clean the walls and coils and other parts, each coil unit being tubular, the tubular opening of each coil being of elliptical cross-section throughout with the major axis of the ellipse extending laterally with reference to the axis of the unit and the area of the cross-section of the tubular opening each unit being substantially the same at all points throughout the length of the unit, the bottom of said casing directly beneath said central space being provided with a manhole, the under side of said casing bottom being provided with a seat, said seat serving to provide a water tight joint between said casing and another member, said other member, means carried by the casing bottom for securing said other member firmly against said seat, and suitable inlet and outlet connections with said coil units extending through openings in the wall of said casing.

9. A vacuum pan comprising a cylindrical enclosing casing, steam coil units therein in upright series, each unit being tubular and the tubular opening through the coil having an elliptical cross-section throughout with the major axis of the ellipse transverse to the unit axis, the area of the cross-section of the tubular opening of each unit being substantially the same at all points throughout the length of the unit, inlet and outlet connections with said units extending outward through openings in the wall of said casing, said coil units being spaced from said wall and from each other a distance approximating the minor axis of said ellipse and providing a central space of a minimum width equal to about twice said major axis, said central space being large enough to permit a person to enter therein and readily clean the wall and units and other parts within the casing, and the spacing of said units from the wall and from each other being such as to permit the person in said central space when so cleaning to readily get at all the surfaces to clean the same, the bottom of said casing directly beneath said central space being provided with a manhole for the entry of the person into said central space, the under side of said casing bottom being provided with a seat, a member adapted to fit upon said seat with a water tight connection, and means carried by said casing bottom for removably securing said member firmly against said seat.

10. A vacuum pan comprising a cylindrical casing, steam coil units therein in upright series, each unit being tubular and the tubular opening through the coil having an elliptical cross-section throughout with the major axis of the ellipse transverse to the unit axis, the area of the cross-section of the tubular opening of each unit being substantially the same at all points throughout the length of the unit, inlet and outlet connections with said units extending through openings in the casing wall, said units providing a central space for the admission of a person to clean the interior of the casing and the exteriors of the units and other parts, the bottom of said casing directly beneath said central space being provided with a manhole, a removable circular dam having a flange adapted to engage a seat about said manhole and a vertical sleeve adapted to extend upward through said manhole, and means for providing a substantially water tight joint between said dam and seat.

11. A liquid treating coil unit comprising a tubular connecting member and a sheet metal tube for extending the tubular passage of said member, said connecting member being a casting having a main tubular portion and a radial tubular portion extending outward from said main portion, the outer end of said radial portion being adapted for connection to a suitable connecting pipe, said main tubular portion terminating in a prolonging flange projecting outward beyond a transversely extending abutting shoulder, the sheet metal tube being composed of thin material abutting against said shoulder and fitting snugly over, and secured to, said flange, the main tubular portion of said casting and the sheet metal tube connected thereto being concentric to the axis of the unit and the cross sectional opening through the coil, including both the tube and casting, being elliptical throughout with the major axis of the ellipse in the plane of the coil.

12. A liquid treating coil unit comprising a tubular connecting member and a sheet metal tube for extending the tubular passage of said member, said connecting member being a casting having a main tubular portion and a radial tubular portion extending outward from said main portion, the outward end of the radial portion of said member being adapted for connection to a suitable connecting pipe, said main tubular portion terminating in a prolonging flange, the sheet metal tube being composed of thin material fitting snugly over, and secured to, said flange, the main tubular portion of said casting and the sheet metal tube connected thereto being concentric to the axis of said unit, and the cross sectional opening through the coil, including both the tube and casting, being elliptical throughout with the major axis of the ellipse in the plane of the coil.

ALEXANDER J. HLATKY.